United States Patent Office 3,331,099
Patented July 18, 1967

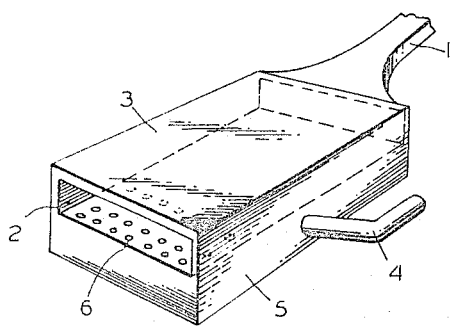
FIG.1
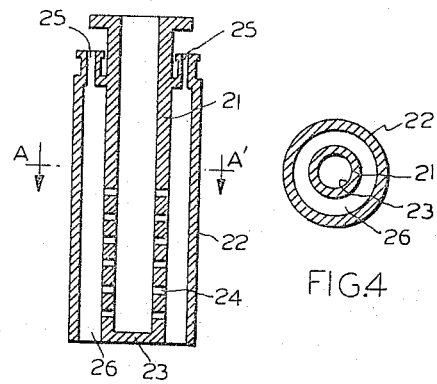
FIG.3
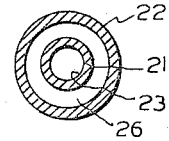
FIG.4
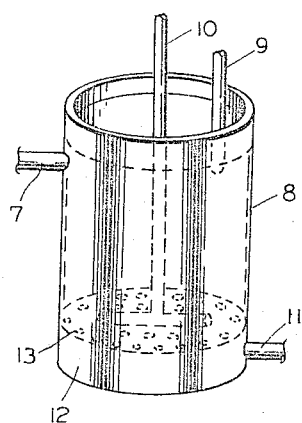
FIG.2
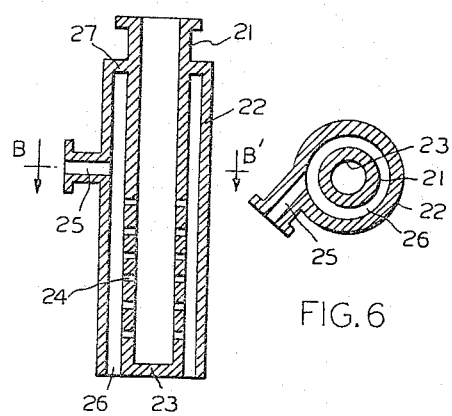
FIG.5
FIG.6

3,331,099
APPARATUS FOR MANUFACTURING CONTINUOUSLY CELLULOSE ESTERS FROM CELLULOSE ESTER SOLUTION
Sohei Saito, Yutaka Yagi, Satoru Tsunoda, Naoshige Fuyimoto, Kenichi Irie, Yahiro Hatano, all of Iwakunishi, Japan, assignors to Teikoku Jinzo Kenshi Kabushiki Kaisha, Osaka, Japan, a corporation of Japan
Original application Dec. 20, 1960, Ser. No. 77,055. Divided and this application Apr. 5, 1965, Ser. No. 458,497
Claims priority, application Japan, Dec. 28, 1959, 34/40,983; Mar. 31, 1960, 35/10,480, 35/10,481, 35/10,482
4 Claims. (Cl. 18—1)

This application is a division of applicants' parent application Ser. No. 77,055, filed Dec. 20, 1960, now abandoned.

This invention relates to an apparatus for continuous precipitation of cellulose esters in granular form from a cellulose ester solution and an apparatus for washing said granular precipitates with a counter current of washing liquid such as water or an aqueous solution of dilute acetic acid.

The primary object of the present invention is to provide in manufacturing cellulose ester precipitates of such as cellulose acetate by contacting a precipitant with a cellulose ester solution of such as cellulose acetate an apparatus for manufacturing granular precipitates capable of being washed continuously by causing a washing liquid to flow counter currently.

A further object of the invention is to provide an apparatus for the continuous precipitation of cellulose esters from a cellulose ester solution and the washing of said cellulose esters.

A still further object is to provide an apparatus for continuously preparing from a cellulose ester solution cellulose esters of high as well as uniform purity whose rates of recovery of methylene chloride and aliphatic acids are high.

Other objects and advantages of the invention will become apparent from a consideration of the following detailed description taken with the accompanying drawings, in which:

FIGURES 1 and 2 are perspective views of a granulating apparatus;

FIGURES 3, 5, 7 and 9 are longitudinal sections of a granulating apparatus;

FIGURES 4, 6, 8 and 10 are cross-sectional views taken on lines A-A', B-B', C-C' and D-D' in the respective above figures that correspond;

Figure 7:
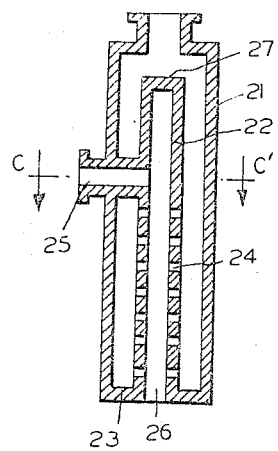

Generally, when the organic acids, particularly the lower aliphatic acids, are prepared from cellulose such as pulp, linter, etc., the cellulose esters are obtained in solution. Hence, in order to obtain cellulose esters in their ordinary state, it is necessary to contact this cellulose ester solution with a precipitant and precipitate the cellulose ester and thereafter wash the precipitates to remove therefrom such as the solvent, precipitant, inorganic salts, etc.

For example, cellulose acetate is usually obtained as an aqueous acetic acid solution or an acetic acid-hydrocarbon chloride solution such as an acetic acid-methylene chloride or an acetic acid-ethylene chloride solution, which contains some water. Or, in the case of cellulose propionate and cellulose butyl acetate, they also are first prepared as the solutions thereof containing some water, namely, respectively as a propionic acid solution or a propionic acid-hydrocarbon chloride solution or a mixed acetic acid-lactic acid solution or an acetic acid-lactic acid-hydrocarbon chloride solution. In all of the instances, precipitating and washing operations are necessary. The other lower aliphatic cellulose esters are prepared in an entirely identical manner as in the above cases as solutions containing some water, namely, a lower aliphatic acid solution or a mixed solution thereof with a hydrocarbon chloride.

Therefore, the manufacture of lower aliphatic cellulose esters from the solutions thereof in all of its aspects such as operational procedures, the composition of the solution and the chemicals which are used for purification is exceedingly similar in the points that the esters are precipitated from either a lower aliphatic acid solution or a mixed lower aliphatic acid-hydrocarbon chloride solution thereof and that washing is performed for removing these lower aliphatic acids and/or hydrocarbon chlorides and inorganic salts from said precipitates. Consequently, the present invention is equally applicable in the precipitation of the various cellulose esters of lower aliphatic esters from their respective solutions and the subsequent washing of the precipitates.

The invention will be described in detail with particular reference to the manufacture continuously of cellulose acetate from its solution.

In the heretofore generally practiced process for preparing a cellulose acetate solution the cellulose such as pulp, linter, etc. was first pretreated by adding acetic acid. This was then acetylated by means of the addition of acetic acid anhydride as a reactant, acetic acid or hydrocarbon chlorides such as methylene chloride, ethylene chloride, etc. as a diluent and acids such as sulfuric acid as a catalyst. A suitable amount of water was thereafter added to this solution to kill the remaining acetic acid anhydride, followed by further additions to suitably adjust the water content and effect partial ripening to make a cellulose acetate of a direct acetic acid content of about 62–53%. By neutralizing the acid with, for example, sodium acetate as a catalyst, the cellulose acetate solution was obtained. For the sake of brevity, in case acetic acid is used as the diluent in the above mentioned process, it will be referred to hereinafter as the acetic acid process, whereas in case the hydrocarbon chlorides such as methylene chloride, etc. is used, it will be referred to as the hydrocarbon chloride process. And in case of the latter, it is a usual practice that the hydrocarbon chloride in the solution is distilled off during the aforesaid ripening or after neutralization.

Thus, in case of the acetic acid process, a solution is formed in which cellulose acetate in the amount of 15–20% by weight has been dissolved in an aqueous acetic acid solution containing on the basis of the liquid component (the components of said liquid from which cellulose acetate and organic salts have been removed) usually 3–10% by weight of water. On the other hand, in the hydrocarbon chloride process, a solution is obtained in which cellulose acetate in the amount of about 20–30% by weight has been dissolved therein, which contains on the basis of the liquid component usually 10–20% by weight of water and less than about 10% by weight of hydrocarbon chlorides, the remainder being of acetic acid. In the latter case, it is usually difficult to remove completely the hydrocarbon chlorides; it being usual that about 1–3% by weight of the hydrocarbon chlorides remain in the solution even when positive measures are taken for their removal.

According to the present invention, the usual cellulose acetate solution obtained by either the acetic acid or hydrocarbon chloride process may be used as the starting material without further processing. For the sake of brevity, said cellulose acetate solution will hereinafter be referred to as the dope.

In accordance with the invention, a stream of precipitant is made to flow rapidly along a surface wherein one or more orifices open up so as to cut across the axes of the stream of a dope extruded from said orifices whereby said dope is cut by said precipitant as to form cellulose acetate precipitates of granular shape. In this instance, either water or an aqueous solution of acetic acid of concentration less than 40% by weight, preferably an aqueous acetic acid solution whose concentration of acetic acid is 25–40% by weight, is used as the precipitant. Unless otherwise indicated, all percentages and parts indicated hereinafter are by weight.

In the present invention, it is mandatory in preparing the granular cellulose acetate as hereinabove described to ensure that the water content on the basis of the liquid component does not exceed 40%. We also found by our studies that when a dope whose water content based on the liquid component is 23–40%, particularly 23–33%, was used, the handling of the dope, for example, its transportation and extrusion was made easy and also that it was most advantageous in the removal of the sodium sulfate during the washing step to be described hereinafter. The reasons therefore will be explained below.

The crystalline sodium sulfate that is formed during neutralization has a property that its solubility increases concomitant with an increase in the water content of the dope. Considered from the amount of the catalyst sulfuric acid that is used in the methylene chloride process or the acetic acid process, generally the critical point with respect to solubility or insolubility is found to be at the point when the water content is 23%. When the water content is above 23%, the sodium sulfate in the dope is almost perfectly dissolved, and when this dope is precipitated, the dissolving out of the sodium sulfate is very rapidly accomplished as to result in lowering the ash content in the product as well as an enhancement of its transparency. Further, when the water content of the dope based on the liquid component becomes above 23%, with the development of minute capillary structures in the precipitate the precipitation and purification during washing is made easy as to bring about exceptional improvements in the solubility, transparency and heat stability of the product. On the other hand, when the water content becomes less than 23%, the viscosity rises as to not only make the removal of sodium sulfate more difficult, but also a tendency to the gradual formation of hard precipitates difficult to wash occurs.

When however the water content of the dope becomes higher than 40%, the dope losing all of its viscosity gels completely. Hence, continuous precipitation becomes impossible and granular precipitates cannot be obtained, since it would become powdery during precipitation.

Therefore, while it is suitable to employ a dope whose water content is 23–40%, in case, the water content is 33–40%, since the viscosity would rise and there would appear the tendency to partial gelling at low temperatures, it is necessary to maintain the temperature slightly high, for example, such as 40–80° C.

According to the invention, it is suitable to use a dope whose viscosity has been adjusted to 500–20,000 poises, particularly 1000–10,000 poises for obtaining a granular precipitate. In order to adjust the viscosity of the dope within aforesaid suitable range, in case of the hydrocarbon chloride process, by removal of the hydrocarbon chloride to at least less than 10%, since the content of the cellulose acetate in the dope becomes larger than in case of the acetic acid process in this instance, a dope of suitable viscosity can readily be obtained at room temperature. Accordingly, in the present invention, the cellulose ester dope by the hydrocarbon chloride process is especially suitable. However, even in case of a dope obtained by the acetic acid process, by adjusting the manufacturing conditions as to increase the content of the cellulose acetate to become as large as possible or by maintaining the temperature of the dope at a relatively low level or by using high molecular weight cellulose acetate, etc., a dope having the aforesaid suitable viscosity can be obtained.

The reason why it is preferred that the viscosity of the dope be in the range 500–20,000 poises, particularly 1000–10,000 poises, as described hereinabove, is as follows: If the viscosity is too low, it becomes difficult to obtain a uniform granular form of the precipitate when the stream of precipitant cuts across. In addition, with the decrease in the viscosity, there is a gradual increase in the quantity of fibrous or cottony precipitates. On the other hand, when the viscosity becomes too high, difficulty is incurred first of all in the transportation of the dope, and also a necessity for a very large quantity of precipitant would arise as to finally make the cutting by the precipitant difficult; and thus it would become impossible to obtain granular precipitates.

Therefore, when the various aforesaid conditions are considered from an industrial standpoint, it is most desirable to employ a dope whose viscosity ranges from 1000 to 10,000 poises, as described hereinabove.

Further, even though the viscosity of the dope according to the invention falls within the above range, it is desired that the formation of precipitates of uniform granulation with a minimum of those which are fibrous or cottony be ensured by appropriately adjusting the rate of flow of the precipitant, the structure of the granulating apparatus, the configuration of the fluid flow, etc.

In addition, according to the invention, the diameter of the orifice for extruding the dope is an important factor, it being observed from results of experiments that normally a diameter less than 10 mm., particularly 1–5 mm. was most suitable.

As has been described hereinabove, while the intended granular precipitates are obtainable by using a dope whose viscosity ranges 1000–10,000 poises and extruding the same through orifices the diameter of which are less than 10 mm., when the interrelationship between the various factors is summed up, it is that, for example, in case the viscosity of the dope is comparatively low, by reducing the velocity at which the stream of precipitant cuts across the surface where the orifices open the formation of the aforementioned fibrous or cottony cellulose esters is prevented. For this purpose, it is desirable to make the orifice diameter small, and by thus doing it becomes possible to prepare uniform granular precipitates of much smaller particles. As a rule, if the velocity of the precipitant stream is constant, the higher the viscosity of the dope becomes, the greater the particles of the precipitates become. Hence, in order to obtain precipitate particles constant in size, in proportion with the increase in the size of the particles the velocity of the precipitant stream should be increased. Also, by decreasing the size of the orifice, it becomes possible for the cutting by the precipitant to be effected even with a comparatively low velocity.

Thus, according to the invention, in order to obtain particles having a predetermined size, it is possible to obtain through suitable manipulation the optimum conditions of such as the orifice diameter, the velocity of the precipitant, configuration of the flow and the amount of dope extruded such as the changes in the viscosity of the dope, etc.

Next, several embodiments of granulating apparatuses suitable for manufacturing the granular cellulose acetate precipitates according to the invention which comprises causing a stream of precipitant to flow rapidly along a surface wherein one or more orifices open up so as to cut across the axes of the streams of a dope extruded from said orifices whereby the dope is cut by said precipitant will be described with reference to the accompanying drawings, FIGURES 1–10.

In FIGURE 1, the granulating apparatus is separated into a precipitant chamber 3 having a precipitant inlet pipe 1 and a discharge opening 2, and a dope chamber 5 provided with a dope inlet pipe 4. 6 are numerous orifices provided in the dope chamber, which orifices face the precipitant chamber 3. Hence, the dope which is introduced into the dope chamber 5 via the dope inlet pipe 4 is extruded from the numerous orifices 6 into the precipitant chamber 3 where it is cut into particles by means of the stream of precipitant introduced into said chamber.

In FIGURE 2, an embodiment will be shown in which the precipitant is mechanically stirred and the dope is cut by the stream created thereby. In this modification, the granulating apparatus is separated into a stirring chamber 8 having a precipitate and precipitant discharge pipe 7 and dope chamber 12 having a dope inlet pipe 12. The dope chamber 12 is provided with numerous orifices 13 which face the stirring chamber 8; 9 is the preciptant feed pipe while 10 is a stirrer which is provided at its extremity with vanes for forcefully and effectively stirring the precipitant in the stirring chamber 8. Hence, the dope which has been introduced into the dope chamber 12 is extruded from the orifices 13 into the stirring chamber, where it is cut by means of the stream of precipitant created by stirring with the stirrer 10. In this instance, when the orifices are provided over the whole surface of the dope chamber, while it is not that the dope is not cut completely, but since there is a difference between the cutting power of the precipitant stream in that part near the center and that part near the periphery, a precipitate of uniform granulation cannot be obtained. Thus, it is necessary to provide the orifices near the periphery. Furthermore, it is preferable that the stirring vanes be positioned close to the surface where the orifices have been bored in order to render them fully effective.

Next, another modification in which the granulating apparatus is of the nozzle type, and which is more convenient in its use will be described.

In FIGURES 3 to 10, 21 is a tubular member for feeding the dope, which is closed at its one end with a dead piece 23 and provided with one or more orifices 24 in its side wall. 22 is a tubular member for the precipitant in which has been provided a precipitant inlet pipe 25 and a precipitant and precipitate discharge opening 26. 27 is the dead piece for the tubular member 22 for the precipitant. In FIGURES 3 and 4, the dope, which has been introduced into the tubular member 21 for the dope, is extruded from the orifices 24, and is cut by the precipitant which is introduced from the precipitant inlet pipe into the tubular member 21 for the precipitant. In such a case, as this when the stream of precipitant is caused to act in a manner as to cut across at right angle the stream of dope along the surface where the orifices open up to the side of the tubular member 21, more than two precipitant inlet pipes must be provided in case the periphery of the tubular member has been provided with a great number of orifices.

In the above FIGURES 1, 3 and 4 a description has been made only of instances when the stream of precipitant was made to cut across substantitlly at right angle the stream of dope along the surface where the orefices open up. When, however, as hereinafter described in reference to FIGURES 5 to 8, a gyratory stream is made to act along the surface where the orifices open up, the cutting of the dope and granulation is still more effectively performed.

Precisely, in FIGURES 5 and 6, the dope that is extruded from the orifices 24 is cut by the precipitant which upon being introduced from the precipitant inlet pipe 25 provided preferably as to introduce the precipitant in the direction of the broken line becomes a gyratory stream. While we have illustrated an instance in which the precipitant is introduced from a single precipitant inlet pipe 25, needless to say, a plurality of inlets may be provided for creating the gyratory stream effectively.

Figure 8:
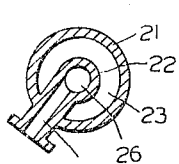

FIGURES 7 and 8 shows an embodiment which is similar to that shown in FIGURES 5 and 6, but is modified in that the tubular member 21 for the dope has been provided surrounding the tubular member 22 for the precipitant. The modification shown in FIGURES 9 and 10, as hereinafter described, is however the most effective as a granulating apparatus for obtaining precipitates most nearly granular in form and containing none that are cottony. Precisely, the dead piece 23 of the tubular member 21 is formed with a curved surface wherein are provided one or more orifices 24. 28 is a curved-surface gyratory stream chamber which consists of a dead piece 27 for the precipitant and an annulus 22 for the precipitant having a discharge opening 26 for the precipitant and precipitate, and a dead piece 23, wherein the inner surface of the annulus 22 is formed with a curved surface designed so that as it approaches the tip of the dead piece 23 it becomes somewhat narrower for rendering the gyratory stream much more effective. Thus, a powerful gyratory stream of precipitant is made to cut across along the surface where the orifices 24 open up, and the dope can be continuously precipitated as precipitates of almost perfect granulation.

According to the invention, one or more of the above described granulating apparatuses are disposed above a precipitation vessel. The granular precipitates formed by the granulating apparatus, after being held in the precipitation vessel, are removed from the lower layers of the precipitate and thereafter washed. For this purpose, the apparatus, as shown in FIGURES 11 and 12, is suitable.

Figure 11:
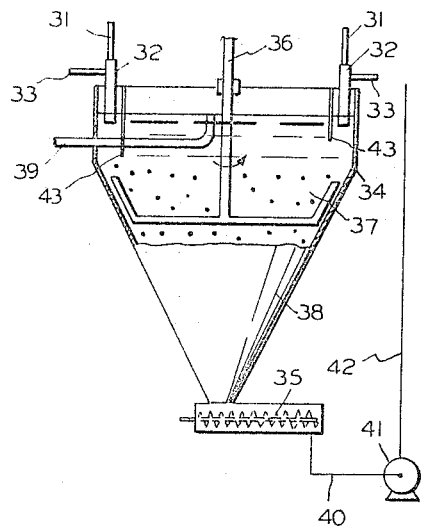
Figure 12:
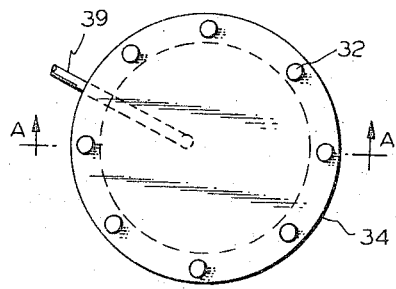
FIGURES 12 and 13 are schematic views showing a precipitating apparatus for the continuous precipitation of a cellulose ester solution in granular form.

In FIGURES 11 and 12, one or more granulating apparatuses 32 provided with a dope feed pipe 31 and a precipitant feed pipe 33, as illustrated in the aforesaid FIGURES 1–10, are disposed at suitable locations above precipitation vessel 34. The granular precipitates formed here descend to a floating part 37 of the precipitation vessel 34 where they are stirred with a stirrer 36 during which time a relatively hard skin is formed on the surface of the precipitates. Then, after being stacked in a bin 38, they are transported away with a conveyor 35, which is, for example, of the screw type. The granular precipitates and the precipitant which leave the conveyor as a slurry passes through a pipe 40 and then is transported to a washing apparatus or a precipitant separator by means of a pump 41 and a pipe 42. The conveyor 35 may also be, for example, of the screw press type. In this case, since the precipitates are removed in a state where they, having been separated from the precipitant, are slightly moist, they can be transported to the washing step without passing through a precipitant separator.

In addition, as auxiliary devices the precipitation vessel 34 may be provided with an overflow pipe 39 for the purposes of maintaining constant the liquid level of the precipitant, or baffles 43 may be provided near the granulating apparatus 32 so as to guide the granulated precipitates formed by the granulating apparatus 32 directly to the floating part 37 of the precipitation tank 34 and in consequence preclude the granular products from becoming lost through the overflow pipe 39.

In the floating part 37 of the precipitation vessel 34, a stirring vane 36 may be provided as to cause the granular precipitates to float for awhile in the precipitant. Further, by designing the lower part of the precipitation vessel 34 as to assume a conical shape, it becomes possible by holding the precipitates here for awhile to cause complete precipitation to occur to the interior as well as accomplish sufficient purification in the meantime, and furthermore the removal of the precipitates from the precipitation tank in an orderly fashion.

Figure 13:
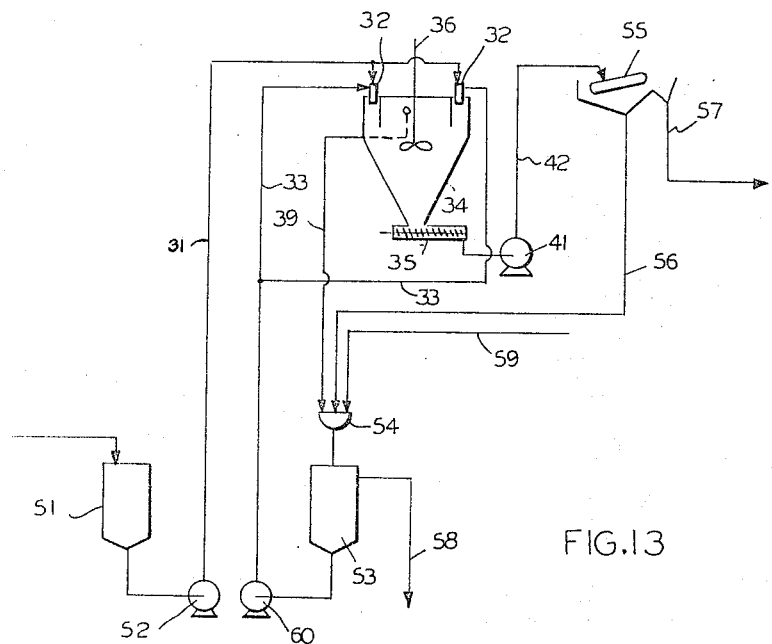

As illustrated in FIGURE 13, the precipitant can be reused as follows: The precipitant discharged from the precipitation vessel 34 is separated by means of the overflow pipe 39 and/or separator 55 and is collected in the precipitation vessel 53 after having passed through a strainer 54, if necessary. After having been adjusted to the specified acetic acid concentration by means of water or an aqueous solution of dilute acetic acid introduced from a pipe 59, it may be recirculated to the granulating apparatus 32 via a pump 60 and a pipe 33. The increased liquid portion that results from the water or the aqueous solution of dilute acetic acid used as the diluent and the chemical liquor dissolving out of the dope (such as acetic acid and water) is transferred to the recovery plant by means of a pipe 58. The granular cellulose acetate and the precipitant contained therein separated by the separator 55 is conveyed by a pipe 57 to a washing apparatus (not shown). In FIGURE 13, 51 is the dope tank, while 52 and 31 are the pump and pipe respectively for transporting the dope.

Therefore, in accordance with the invention, by doing as above, the granulated precipitates formed by the granulating apparatus can be completely as well as continuously coagulated and purified in the precipitant, and this can be then transferred continuously to the washing step with or without the necessity of passing through the separator 55. On the other hand, the precipitant can be diluted to the desired concentration and recirculated to the granulating apparatus while the increased liquid portion may be continuously transferred to the recovery plant. Thus, it is possible to perform the continuous precipitation of cellulose acetate of good quality by maintaining constantly a balance in the total liquid portion without no loss at all.

Figure 14:
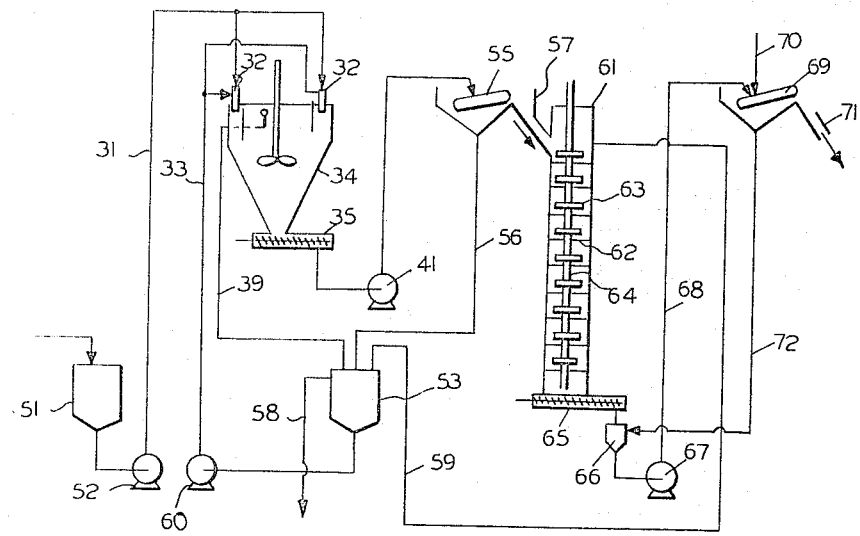
FIGURE 14 is a schematic view showing a continuous precipitating and washing apparatus for precipitating said solution in granular form and the continuous washing of the resultant precipitate.

Next, in accordance with the invention, the granular precipitates, which have been continuously precipitated and then separated from the precipitant, are thereafter washed continuously as shown in FIGURE 14.

The washing process according to the present invention is characterized in that the granular precipitates from which the precipitant has been removed are fed in from the top of a vertical washing tower having two or more baffles having holes therein, on top of which baffles are provided respectively stirring vanes, the washing liquid is imparted a flow upwards from the bottom of the tower and overflows at the top of the tower and the washed granular product is removed from the bottom of the tower, this washing process being repeated, if necessary, whereby the washing is completed.

Referring to FIGURE 14, a preferred washing process embodying the invention will be described. In this figure, with respect to those parts that are identical to those shown in FIGURE 13 the same reference numbers have been given, and the description of these parts will be omitted.

In FIGURE 14, the granular precipitates from which the precipitant has been separated by means of the separator 55 is fed to the top of a washing tower 61 via the pipe 57. The washing tower 61 is provided with holed baffles 62 in two or more locations, and each has a stirring vane mounted thereabove. The granular product fed from the top descends through the tower 61 by passing through the holes of the baffles while being suitably stirred by the stirring vanes 63 and are conveyed by a conveyor 65 to a vessel 66. Then it is conveyed by means of a pump 67 and a pipe 68 to a washing liquid separator 70 where it is separated from the washing liquid and thereafter is either transferred immediately to the drying step or, if necessary, the washing operations is repeated in a similar manner once or for several more times. On the other hand, the required amount of fresh water is added to the separator 70, which together with the washing liquid separated by the separator passes through a pipe 72 and enters the vessel 66. This increased washing liquid in the circulating system consisting of the aforesaid 66, 67, 68, 69 and 72 is continuously conveyed to the bottom of the washing tower 61 via the conveyor 65 where it is made to flow gradually upwards in the tower 61 whereby contacting the granulated product it dissolves out the acetic acid remaining in the granulated product and accomplishes the washing thereof. The washing liquid which has been thus concentrated overflows out through the overflow pipe 59 of said washing tower 61 and is conveyed to the precipitant tank 53.

In the invention, by regulating such as the stirring rate of the stirring vanes 63 that have been provided in the tower 61, the size of the holes in the baffles, the quantity of the washing liquid, the amount of the granular product fed, the relationship of the tower diameter to its height, the temperature of the washing liquid, the quality of the water used, etc., washing of the granular product in a most economical manner without deterioration in its quality is possible.

Heretofore, in the continuous washing of cellulose esters such as cellulose acetate, etc. it was the normal practice to load the precipitates on a bed conveyor consisting of a wire netting and transport it while from the other end fresh water was fed for washing the precipitate being moved along on the conveyor. The used washing water, a part of which was reused in a prior washing stage, was collected in a tank, while a part of this water at the same time was successively removed and again used for washing in an early stage. In this method of washing the washing water was also fed counter current to the flow of the cellulose acetate and was discharged as a concentrated aqueous acetic acid solution at the cellulose acetate feeding end. Since, according to this method, the cellulose acetate layer is conveyed in a state that is substantially the same as if it were left standing still, the washing efficiency is lower. In consequence, not only an excessive amount of washing water is necessary but also the concentration of the aqueous acetic acid solution to be recovered is lowered as well as the quantity of solution itself is increased. Thus, from an economic angle, the above described method is not desirable. In addition, with the need for a great number of pumps, for example, more than 10 or so, it is not desirable from the construction cost standpoint either.

There were also other defects arising from its setup being as described above. There was difficulty in sealing the apparatus against losses of such as the chemical liquid, for example, acetic acid, methylene chloride, etc. as well as the cellulose acetate in powdered form, which losses were considerable as to make it undesirable from an economical standpoint.

In contrast, in accordance with the present invention, by adopting a very simple apparatus, not only the necessity of using a great number of pumps is obviated, but also the washing efficiency is exceedingly high owing to the fact that the granular product itself moves through the washing tower at a suitable speed. Furthermore, since the apparatus is a completely sealed system, the aforementioned losses of the chemical liquid can be made practically nil. In addition, with much less washing water needed, the recovery efficiency is high. Thus, when compared with such as the generally practiced conveyor belt continuous washing method, that of the present invention possess exceptionally superior advantages.

The most important reason why the method as used in the present invention was not hitherto used was due to the fact that the shape of the cellulose acetate was of very irregular flaky or fibrous form with a large amount in powdered form also mixed in. In this case, if the washing method of the present invention were used, with an extreme difference in the size of the particles, what would occur would be that those particles of large size requiring thorough washing would rapidly pass through the tower whereas those which washing would be most readily accomplished such as those of fibrous, cottony or powdery form would remain floating at the upper part of the tower or would be lost by flowing out of the overflow pipe. On the other hand, in accordance with the present invention, inasmuch as the precipitates can be obtained, as described hereinbefore, in a very uniform granular form, it is possible to avoid the difficulties such as was encountered by those conventional precipitates which were of either flaky, fibrous, cottony or powdery form. Consequently, the obtaining of cellulose acetate of good quality most economically has been realized.

While several instances of the preferred methods and apparatuses have been described hereinabove with reference to FIGURES 1–14, in the invention as illustrated in FIGURES 13 and 14 it is also possible to add to a part of the precipitant drawn out from the precipitation vessel 34 by means of the conveyor 35 or from the overflow pipe 39 water or an aqueous acetic acid solution of a lesser acetic acid concentration than said precipitant, precipitate the cellulose acetate of a low degree of polymerization or of fibrous form that remain dissolved in the precipitant and after filtration, combine the filtrate with other precipitants and recirculate the same whereby the purity of the precipitates which is to be made into the finished product is enhanced. Or, in case there adheres to the granular precipitates a small amount of undesirable fibrous, cottony or flaky admixtures, it is also possible, according to the invention, by feeding the granular precipitates to that part somewhat below the liquid level at the top of the washing tower to make the admixed fibrous, cottony, flaky or powdery precipitates float on top of the liquid surface in the tower and to remove the same by overflowing. In addition, in performing this removal by overflowing, in order to enhance the floating efficiency the overflowing liquid may be first filtered and the obtained filtrate recirculated to that part below the liquid level of the top of the tower.

While the invention has been described hereinbefore in detail concerning the instance of continuously manufacturing granular precipitates of cellulose acetate from a cellulose acetate solution and the method of washing the same continuously, the invention can also be applied in entirely the same manner to the continuous precipitation and washing in obtaining of the other cellulose esters from their cellulose ester solutions.

To further illustrate the present invention and advantages thereof, the following examples are given, it being understood that these are merely intended to be illustrative and do not in any manner limit the invention.

EXAMPLE 1

In advance, 60 parts of wood pulp were pretreated by adding 30 parts of glacial acetic acid. This was acetylated at 50° C. by adding 180 parts of acetic acid anhydride, 250 parts of methylene chloride and 0.6 part of sulfuric acid. Upon completion of the reaction, 40 parts of water was added and the excess acetic acid anhydride was killed. Then 10 parts of water and 5 parts of sulfuric acid were added and the solution was ripened for 6 hours at 50° C. followed by neutralizing with 8 parts of sodium carbonate whereby an acetone soluble cellulose diacetate solution was obtained. By raising the temperature during ripening and neutralization to 80–90° C. a greater part of the methylene chloride was removed and the concentration of the cellulose diacetate was 26%. Thus a cellulose acetate solution whose viscosity was 4300 poises (50° C.) composed of 52% of acetic acid, 1.0% of methylene chloride, 20% of water and 1.0% of others was obtained.

Figures 9, 10:
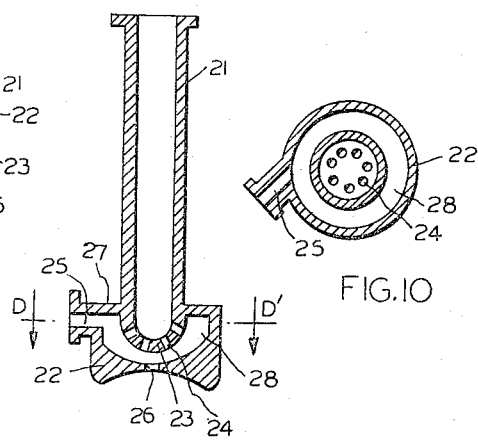

This solution was precipitated at 40° C. using a precipitant consisting of a 25% aqueous acetic acid solution followed by washing in which process a precipitating and washing apparatus, as shown in the drawings, provided with a granulating apparatus illustrated in FIGURES 9 and 10 whose orifice diameter was 3 mm., was employed. The obtained precipitates were dried with a conventional belt conveyor type dryer. When the resultant product was compared with that which were commercially available, the results were as follows:

| Item | Process Used | |
|---|---|---|
| | Process according to present invention | Process of commercially available product |
| | Form | |
| | Granules 10–14 mesh | Lumps 4–100 mesh |
| Acetic acid content (percent) | 54.2 | 54.7 |
| Degree of polymerization (degree) | 19.0 | 18.2 |
| Ash (percent) | 0.03 | 0.05 |
| Acetone solution transparency (percent) | 91 | 75 |
| Stability (percent) | 0.041 | 0.080 |
| Filterability (KW) | 350 | 530 |

While the yield in case of the conventional processes is 92–94%, the yield in accordance with the present invention is 96%.

EXAMPLE 2

60 parts of wood pulp was pretreated by adding 30 parts of glacial acetic acid. This was acetylated at 50° C. by adding 180 parts of acetic acid anhydride, 280 parts of methylene chloride and 0.6 part of sulfuric acid. Upon completion of the reaction, 40 parts of water was added and the excess acetic acid anhydride was killed. Then 10 parts of water and 5 parts of sulfuric acid were added, and the solution was ripened for 6 hours at 50° C. followed by neutralizing with 8 parts of sodium carbonate whereby a cellulose diacetate solution was obtained. During ripening a greater part of the methylene chloride, 245 parts thereof, was distilled off, and by adding subsequently 91 parts of water a solution of 8000 poises at 50° C. was obtained. This was then precipitated at 40° C. in a 25% aqueous acetic acid solution and washed using a precipitating and washing apparatus having the same granulating apparatus as in Example 1. After washing and drying, acetone soluble cellulose acetate was obtained. The acetic acid content of this product was 54.7%, its degree of polymerization, 211, stability (shown by its carbonizing point), 221° C., ash content, 0.087%, 5% acetone solution transparency, 72.1 and its shape was granular.

EXAMPLE 3

Pulp, which was used as the starting material was pretreated with acetic acid. This was then acetylated using a nonacetic reactant, methylene chloride as the diluent and sulfuric acid as the catalyst. When the acetylation was completed, water in an amount more than necessary to kill the residual nonacetic reactant was added and the solution was ripened. When the acetic acid content became 60.5% the catalytic sulfuric acid was neutralized with sodium acetate, and the temperature was raised to 80–90° C. so as to distill off practically all of the methylene chloride whereby a dope of 28% triacetate containing 60.0% acetic acid was obtained whose liquid component was 80.7% acetic acid, 2.5% methylene chloride and 17.2% water and having a viscosity of 13,000 poises at 40° C. While maintaining the temperature of this dope at 40° C. constant quantities of it were pumped using a gear pump into a granulating apparatus as shown in FIGURES 5 and 6 having 20 orifices each 4.0 mm. in diameter while employing as the precipitant a 35% aqueous acetic solution at 40° C. whereby the dope was cut into granules which were dispersed in the precipitant. After holding the triacetate precipitated as granules in the precipitant for about an hour, it was pumped as a slurry to a belt conveyor type separator where it was separated. Then the acetic acid, methylene chloride, etc. contained in the granulated product were completely washed out by means of a vertical, cylindrical-shaped washing apparatus followed by drying whereupon granular cellulose triacetates having a very uniform distribution as to their grain size with their average being 5 mesh were obtained.

EXAMPLE 4

Pulp, which was used as the starting material, was pretreated with acetic acid. This was then acetylated using acetic acid anhydride as the reactant, methylene chloride as the diluent and sulfuric acid as the catalyst. When the acetylation was completed, water in an amount greatly in excess of that necessary for killing the residual acetic acid anhydride was added and at the same time further additions of sulfuric acid were made. Then the temperature was raised to 60° C., and the solution was ripened for 5 hours.

When the acetic acid content become 55%, the sulfuric acid was neutralized with a somewhat excess amount of an aqueous sodium acetate solution. The methylene chloride was distilled off during ripening and after neutralization, but by placing the dope whose temperature was raised to 85° C. under vacuum practically all of the methylene chloride was distilled off. By diluting this at the same time with a 70% aqueous acetic acid solution, a dope was obtained whose acetone soluble cellulose acetate content was 18.5%, its acetic acid content based on the liquid component being 73.4%, water content, 25.3% and methylene chloride content, 1.3%. The viscosity of the dope at 50° C. was 850 poises. This dope, after adjusting its temperature to 50° C. in a dope tank, was pumped to the dope inlet in the granulating apparatus of FIGURES 3 and 4 via a gear pump and pipe. On the other hand the precipitant used was a 30% aqueous acetic acid solution at 50° C. The dope was extruded from a nozzle having 20 holes each 1.2 mm. in diameter into the precipitant where is was precipitated and suspended. The granular acetone soluble cellulose acetate, after being held in the precipitant for 2 hours, was pumped to a belt conveyor type separator where the precipitates were separated from the precipitant. The acetic acid, etc. contained in the precipitates was completely washed out in a vertical cylindrical cellulose acetate washer by means of the counter current process, and the washed cellulose acetate was dried whereby an acetone soluble granular cellulose acetate having a very uniform distribution as to its grain sizes and whose grain sizes averaged 20 mesh was obtained.

EXAMPLE 5

A dope obtained as in Example 4 was used and by employing a nozzle as shown in FIGURE 5 was precipitated and washed in the apparatus illustrated in FIGURE 14. When the concentrated washing liquid, which overflowed from the top of the tower and was conveyed to the precipitant tank 53 via pipe 59, was filtered, appropriately treated and recirculated to the granulating apparatus for reuse, this process being continuuosly repeated, the properties of the granular product obtained thus was as follows:

| Item | Process | |
|---|---|---|
| | When treated | When not treated |
| Acetic acid content (percent) | 54.2 | 54.2 |
| Acetone solution transparency (percent) | 92.5 | 75.0 |
| Filterability (KW) | 320 | 530 |
| Ash (percent) | 0.04 | 0.05 |
| Heat stability | (¹) | (²) |

¹ Excellent.
² Somewhat inferior.

NOTE.—Acetone solution transparency: A value as obtained by dissolving cellulose acetate in acetone as to become 5%, placing this in a standard vessel and determining the light transmitted therethrough with a colorimetric photometer, which is then expressed as a percentage of that of the case when the acetone alone is used. Filterability: A test value as obtained by the generally performed constant volume filtering method.

EXAMPLE 6

Using pulp as the starting material, it was pretreated with acetic acid. Then, after it was acetylated with a mixed reactant consisting of acetic acid anhydride, acetic acid and sulfuric acid, the residual acetic acid anhydride was killed by adding a large excess of water. The solution was then ripened by keeping its temperature at 35° C., and when the acetic acid content therein became 55.5% an aqueous sodium acetate solution was added to neutralize the sulfuric acid. The thus obtained dope contained 16.5% acetone soluble cellulose acetate, its liquid component consisted of 82% of acetic acid and 18% of water, and its viscosity was 850 poises at 20° C. This dope was pumped by means of a gear pump through a pipe whose temperature was controlled as to not exceed the range of 20–25° C. and introduced into a nozzle having orifices 1.1 mm. in diameter as shown in FIGURE 5. The dope which was extruded from this nozzle was cut and suspended employing a precipitant consisting of a 22% aqueous solution of acetic acid maintained at a temperature of 25° C. The resultant precipitate was washed and dried as described hereinbefore, and granular acetone soluble cellulose acetates of excellent quality averaging 20–25 mesh were obtained.

EXAMPLE 7

Pulp was precipitated with propionic acid and then propylated with a mixture of propionic acid, propionic acid anhydride and sulfuric acid. After adding an excess of water to kill the anhydride, the solution was ripened. When the propionic acid content reached 59%, sodium acetate was added to neutralize the sulfuric acid, and a dope having the following composition was obtained: Namely, 23% of propyl cellulose with the liquid component consisting of 87% of propionic acid and 13% of water. And the viscosity of the dope was 1100 poises at 20° C.

This dope was continuously fed by means of a gear pump to the dope pipe shown in FIGURE 6, from whence it was extruded through orifices having a diameter of 1.5 mm. On the other hand, as the precipitant a 35% aqueous solution of propionic acid was used by means of which the dope was cut and dispersed as granules.

The subsequent steps were as in Example 6 whereby was obtained propyl cellulose of uniform granulation.

While we have described the invention in detail hereinabove, since it is apparent that many changes and modifications are readily possible by those skilled in the art without departing from the nature and spirit of the invention, it is to be understood that the invention is to include all said changes and modifications insofar as the same are embraced by the appended claims.

What we claim is:

1. A granulating and precipitating apparatus for aliphatic cellulose ester solution comprising a precipitation vessel with a funnel-shaped bottom wherein has been provided stirring means, one or more granulating means mounted above said precipitation vessel, said granulating means being means for causing a stream of precipitant to flow along the surface wherein one or more orifices open up so as to cut across the axes of the streams of a cellulose ester solution extruded from said orifices thereby cutting said solution and transporting means provided to the lower part of said precipitation vessel for removing continuously the precipitant and precipitates.

2. A continuous precipitating and washing apparatus for aliphatic cellulose ester solution comprising a precipitation vessel with a funnel-shaped bottom wherein has been provided stirring means, one or more granulating means mounted above said precipitation vessel, said granulating means being means for causing a stream of precipitant to flow along the surface wherein one or more orifices open up so as to cut across the axes of the streams of a cellulose ester solution extruded from said orifices thereby cutting said solution, transporting means provided to the lower part of said precipitation vessel for removing continuously the precipitant and precipitates, said transporting means being coupled with separating means for separation of solids from liquids, means conveying the filtered precipitant to a precipitant tank, said separating means for separation of solids from liquids being coupled with a washing tower so that the precipitates are fed to said tower, said washing tower having at its upper end an inlet for the precipitates and an overflow outlet for the washing liquid and at its lower end transporting means for the washing liquid and the precipitates and an inlet for the washing liquid, two or more hold baffles inside said tower, each of which baffles being provided on the upper side and adjacent thereof with a stirring vane, and a transporting means at the lower end of said tower coupled with separating means for the separation of solids from liquids having a washing liquid inlet pipe provided at the upper part thereof.

3. A continuous precipitating and washing apparatus for aliphatic cellulose esters comprising a precipitation vessel with a funnel-shaped bottom wherein has been provided stirring means, one or more granulating means mounted above said precipitation vessel, said granulating means being means for causing a stream of precipitant to flow along the surface wherein one or more orifices open up so as to cut across the axes of the streams of a cellulose ester solution extruded from said orifices thereby cutting said solution, transporting means provided at the lower part of said precipitation vessel for removing continuously the precipitant and precipitates, said transporting means being coupled with separating means for separation of solids from liquids, means conveying the filtered precipitant to a precipitant tank, said separating means for separation of solids from liquids being coupled with a washing tower so that the precipitates are fed to said tower, said washing tower having at its upper end an inlet for the precipitates and an overflow outlet for the washing liquid and at its lower end transporting means for the washing liquid and the precipitates and an inlet for the washing liquid, two or more holed baffles inside said tower, each of which baffles being provided on the upper side and adjacent thereof with a stirring vane, means for conveying the precipitant overflowing out of the overflow outlet for the washing liquid to a filtering means and the resultant filtrate to said granulating means and a transporting means at the lower end of said tower coupled with separating means for separation of solids from liquids having a washing liquid inlet pipe provided at the upper part thereof.

4. An apparatus for manufacturing continuously spheroidal granular particles from lower aliphatic cellulose esters consisting of a one granulating means comprising a feeding body for said ester solution having an opening for introducing said liquid and at least one orifice for extruding the same, a passage for liquid precipitant being concentrically dispositioned to said feeding body providing a gyratory stream to the liquid precipitant which precipitates said ester solution through a direct opening of said orifice, an opening for feeding of the liquid precipitant which continuously supplies said precipitant to tangential direction to the sectional face of said passage, and an outlet which continuously discharges the precipitates and said liquid precipitant and at least one of said granulating means is mounted on a precipitation vessel with a funnel-shaped bottom wherein there has been provided stirring means and transporting means on the lower part of said precipitation vessel for removing continuously the liquid precipitant and precipitates.

References Cited
UNITED STATES PATENTS

| | | | |
|---|---|---|---|
| 1,757,278 | 5/1930 | Weidman | 134—111 |
| 1,826,015 | 10/1931 | Morton | 134—111 |
| 2,436,459 | 2/1948 | Lincoln et al. | 18—1 |
| 2,570,423 | 9/1951 | Batchelder et al. | 18—2.7 |
| 2,775,788 | 1/1957 | Andrew | 18—12 |
| 2,979,769 | 4/1961 | Andrew | 18—12 |
| 3,189,944 | 6/1965 | Jacklin | 18—2.7 |
| 3,208,929 | 9/1965 | Terenzi. | |

WILLIAM J. STEPHENSON, *Primary Examiner.*